UNITED STATES PATENT OFFICE.

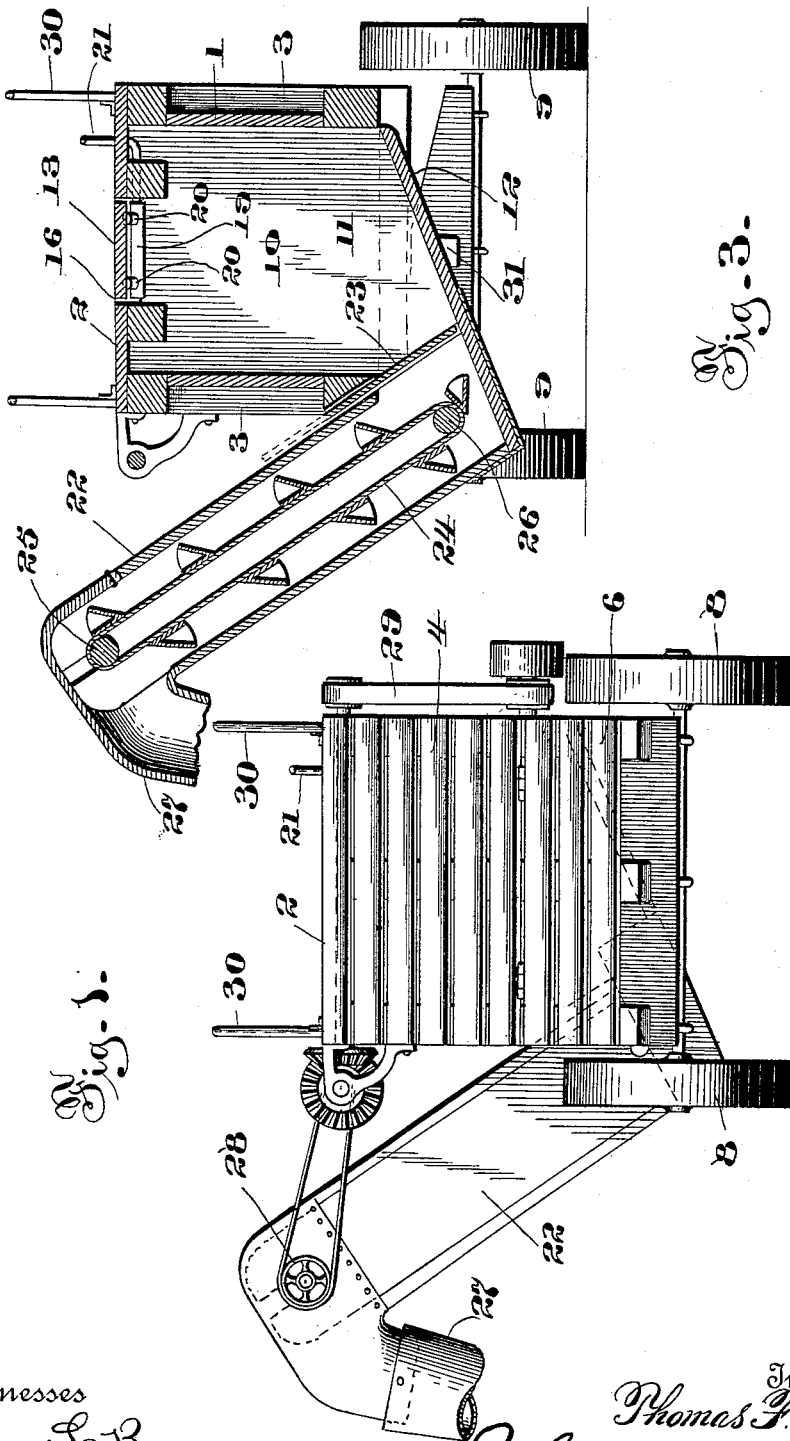

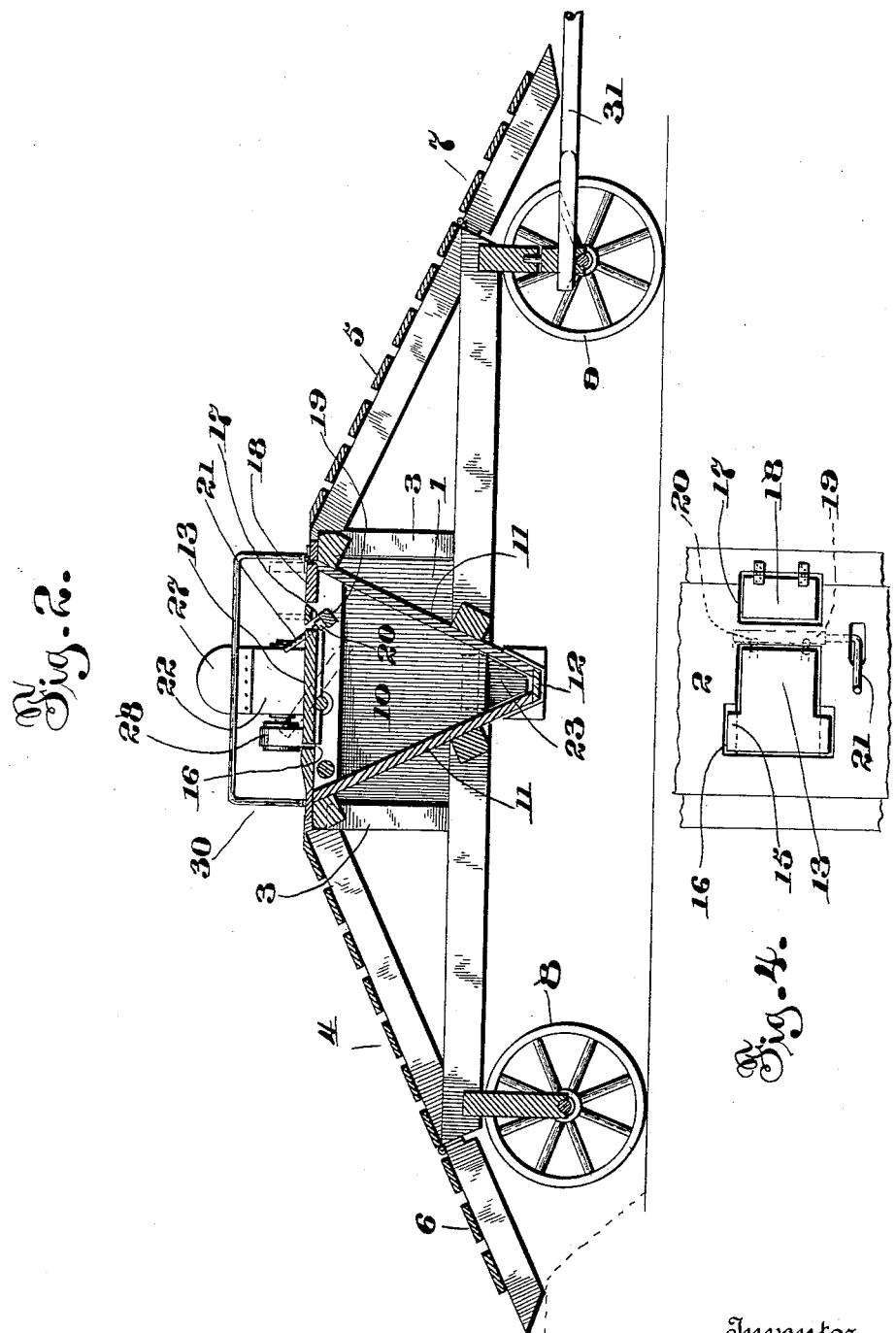

THOMAS F. SCHMITT, OF FAIRVIEW, KANSAS.

PORTABLE GRAIN-ELEVATOR.

SPECIFICATION forming part of Letters Patent No. 602,776, dated April 19, 1898.

Application filed June 24, 1897. Serial No. 642,088. (No model.)

*To all whom it may concern:*

Be it known that I, THOMAS F. SCHMITT, of Fairview, in the county of Brown and State of Kansas, have invented certain new and useful Improvements in Portable Grain-Elevators; and I do hereby declare the following to be a full, clear, and exact description of the invention, such as will enable others skilled in the art to which it appertains to make and use the same.

My invention relates to portable grain-elevators.

My object is to provide a more efficient machine of the class described which will be simple in construction and operation; and with this object in view the invention consists of certain improved features and novel combinations of parts appearing more fully hereinafter.

In the accompanying drawings, Figure 1 is an end elevation; Fig. 2, a longitudinal section; Fig. 3, a cross-section, and Fig. 4 a detail top plan view.

The body of the machine is shown at 1, the same being provided with a flat top 2, and beams 3 extend upward from the body at opposite sides.

The numerals 4 and 5 designate inclines which extend from the top to the ends of the beams. There are hinged incline-sections 6 and 7, which are adapted to be extended to the ground or folded on the main inclines when the machine is not in use. There are two sets of traction-wheels 8 and 9, the latter set having its axle pivoted so that the machine can be swung around easily. The grain-hopper 10 has its flat top elevated above the main or running-gear frame to give the hopper the desired elevation, as shown, and has downwardly-converged sides 11 and a bottom 12, which inclines downwardly toward the grain-elevator side of the machine, said elevator being described later on.

The numeral 13 designates a tilting platform having one part enlarged, as at 15, or expanded in width to extend its ends over the floor-timbers and so constitute a stop or limiting device to prevent the platform from being depressed at that end, said platform fitting in an opening 16 in the top. There is another opening 17 in front of the platform 13, and 18 designates a hinged door for the same.

19 designates a gravity-actuated catch having the lugs 20 and provided with a handle 21. This catch is employed for locking the platform.

The grain-elevator chute is shown at 22, the same leading into the hopper at the lower end of the inclined bottom thereof, and 23 designates a gate to regulate the supply of grain from the hopper to the chute. A carrier 24 operates over upper and lower drums 25 and 26 and conveys the grain to a discharge-spout 27 at the upper end of the elevator. Said spout may be provided with a pivoted tubular extension, if desired, as indicated in Fig 1.

Gearing and belting 28 connects with the upper drum, and the shaft that operates said gearing extends across the machine and is belted at 29 to a main pulley.

I find it preferable to have folding railings 30 at the sides of the top, and 31 designates the draft-tongue.

The operation is as follows: After the machine has been manipulated to bring the spout to the proper position the loaded wagon is driven up the hinged and main inclines, the former having been extended, and on to the tilting platform. The catch is then released and the load dumped into the opening which has been previously uncovered. The grain received in the hopper gravitates to the gate, which having been opened allows it to have access to the elevator, which raises it. The wagon can then be driven down the incline at the other end of the machine.

Having thus described my invention, what I claim as new, and desire to secure by Letters Patent, is—

1. In a wheeled portable grain-elevator, the combination with a body having a centrally-located hopper provided with inclined sides and a bottom inclining downwardly toward one side of the machine, of a tilting platform over the hopper and an elevator comprising a chute leading into the hopper at the bottom thereof, a gate for regulating the supply of grain to the chute, and an endless carrier operating in said chute, substantially as described.

2. In a portable wheeled grain-elevator, the combination with a body having a flat top provided with a central opening, of a tilting platform fitted in said opening, catch mechanism for holding the platform in horizontal position, a hopper located directly under said platform, an elevator leading from said hopper, fixed inclines leading up to the top of the hopper on opposite sides thereof, and supplemental hinged and folding extensions of said inclines, for the purpose and substantially as described.

3. In a portable grain-elevator, in combination with a body mounted on wheels, a hopper located centrally intermediate the front and rear wheels, a dumping-platform over said hopper, an elevator connected with said hopper, fixed or main inclines on opposite sides of the dumping-platform, and supplemental inclines hinged to the lower ends of the main inclines and adapted to be extended to the ground or folded upon said main inclines, substantially as described.

In testimony whereof I have signed this specification in the presence of two subscribing witnesses.

THOMAS F. SCHMITT.

Witnesses:
JACOB SCHMITT,
E. A. ROBBINS.